United States Patent
Kincaid

[15] 3,668,966
[45] June 13, 1972

[54] FASTENER FOR METAL-WOOD STRUCTURES

[72] Inventor: Charles A. Kincaid, Crestwood, Ill.
[73] Assignee: Key Research and Development Company, Mercer Island, Wash.
[22] Filed: Sept. 21, 1970
[21] Appl. No.: 73,696

[52] U.S. Cl. ........................................85/67, 85/72, 85/73
[51] Int. Cl. ..........................................................F16b 13/06
[58] Field of Search................85/67, 72, 79, 74, 73, 77, 85/78, 75, 76, 39

[56] References Cited

UNITED STATES PATENTS

| | | |
|---|---|---|
| 2,697,375 | 12/1954 | Brisack ........................... 85/73 |
| 3,222,977 | 12/1965 | Vaughn ........................... 85/72 |
| 3,230,818 | 1/1966 | Siebol ........................... 85/72 X |
| 3,515,419 | 6/1970 | Baugh ........................... 85/78 X |

FOREIGN PATENTS OR APPLICATIONS

| | | |
|---|---|---|
| 280,322 | 1/1965 | Australia ........................... 85/67 |
| 698,307 | 10/1953 | Great Britain ........................... 85/67 |
| 444,580 | 2/1968 | Switzerland ........................... 85/88 |

*Primary Examiner*—Ramon S. Britts
*Attorney*—Nicolaas De Vogel

[57] ABSTRACT

A fastener for securing a structure of metal and wood together wherein the metal forms at least one outside surface. The fastener comprises three parts: a pin, a locking sleeve and a swaging sleeve, which, when properly arranged within an aperture or straight hole in the structure, is installed by a conventional fastener installing tool. The three parts lock together during the fastening procedure and subsequently: (a) the wood and metal are clamped between the pin head and locking sleeve head, (b) both ends of the swaging sleeve are moved radially outwards, thereby penetrating the wood material that forms the wall of the aperture, and (c) the one end of the wood-penetrating swaging sleeve extends radially along the inside surface of the metal which is parallel to the pin head portion that overlaps the aperture diameter at the metal outside surface, so that the metal layer is separately clamped between that pin head portion and one end of the swaging sleeve. These four fastening actions then produce a permanent, self-sealing, untamperable joint for metal-wood or similarly composed structures.

9 Claims, 5 Drawing Figures

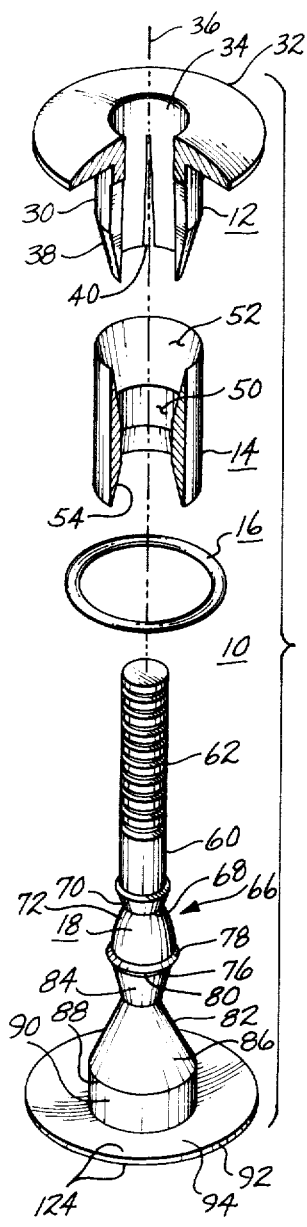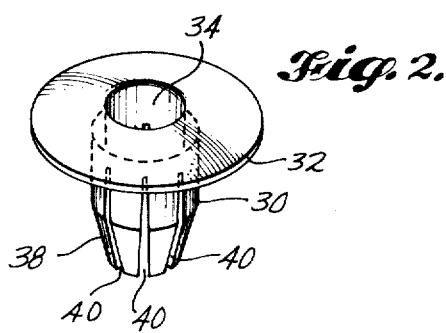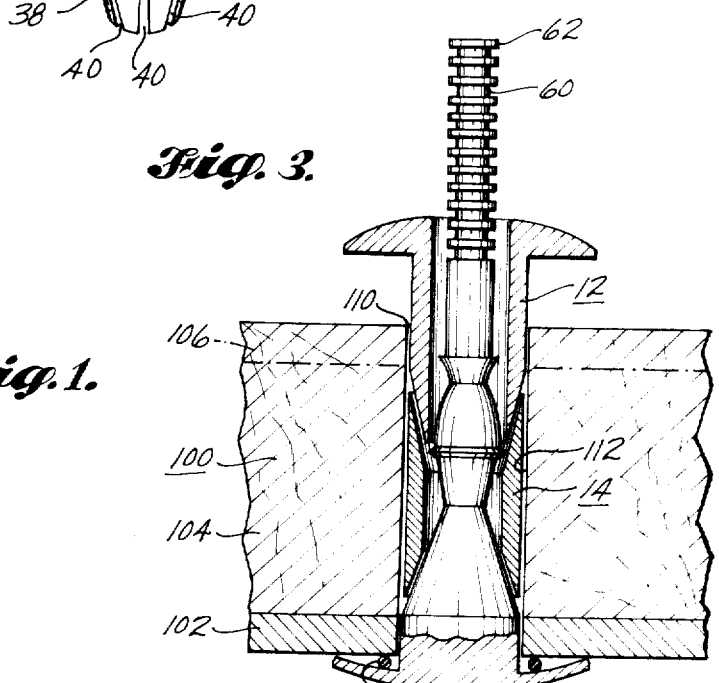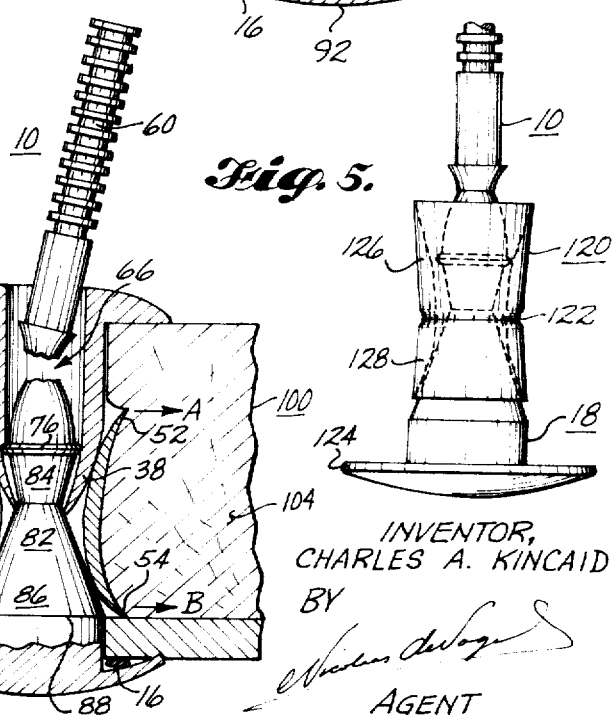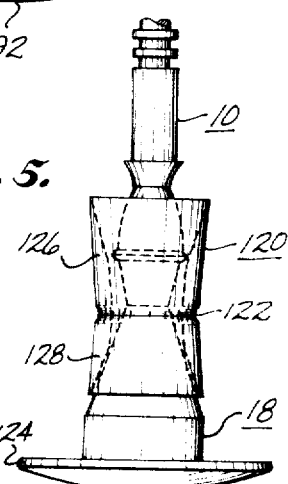
INVENTOR,
CHARLES A. KINCAID
AGENT

FASTENER FOR METAL-WOOD STRUCTURES

BACKGROUND OF THE INVENTION

1. Field of the Invention

This invention relates to fasteners and more particularly to an improved fastener for securing together metal-wood structures and wherein the fastener comprises a pin, a swaging sleeve and a locking sleeve.

2. Description of the Prior Art

Specially developed fasteners for connecting metal to wood or metal to wood and metal in a sandwich arrangement have not been developed in the prior art and, therefore, reference has been made to conventional fasteners.

For instance, the U.S. Pat. No. 2,974,558 by Hodell reveals a structure which appears structurally somewhat similar to the subject invention. It is noted that Hodell discloses a nut E and a sleeve D which may represent the locking and swaging sleeve of the present invention. However, a significant difference exists when comparing Hodell's installing and fastening procedure as well as the cooperation of the individual parts with those of the present invention. In addition, a cross-section of the finished joint by Hodell shows an entirely different result.

Another U.S. Pat. No. 1,596,856 by Setlow and U.S. Pat. No. 3,373,648 by Pitzer show arrangements where two sleeves fit together and expand radially within and are limited to the hole diameter. However, here again the radial expansion is different from the double radial expansion and actual hole-wall penetration achieved by the present invention.

An extensive search showed that the above mentioned patents appear to be the most pertinent in a structural sense.

Thus, when reviewing the fastener art in general, the prime considerations for fasteners are shear strength and/or fatigue resistance. Basically every newly developed fastener tends to improve fatigue life and care is taken to prevent damage to the inside surface of the fastener hole. In many applications cold-working, reaming, etc. are essential.

The metal-wood fastener as described and explained hereinafter is not concerned with the general requirements, and consequently, due to its specialized application, presents a new approach to the fastening art. As a result, the different solution offered solves many problems in the building industry and in the packing and cargo handling filed, in particular, as explained hereinafter.

SUMMARY OF THE INVENTION

The present invention relates to fasteners and in particular to a fastener for mounting metal against wood.

There has been a demand for some time in the various building trades, packaging and cargo handling industry for a high-strength, tamper-proof, permanent and self-sealing fastener for fastening metal to wood, specifically plywood.

Most fasteners used for this purpose are basically developed for metal-to-metal applications, such as the conventional rivet and screw-nut type fasteners. The fastening action of those types of fasteners is performed by the two opposite sides or heads clamping the two or more materials to be fastened together.

In metal-to-wood applications there are different problems to deal with, such as the contraction or shrinking of wood when aging, causing a conventional fastener to become loose, which, in the case of a bolt and/or screw with nut, requires re-fastening. Present methods utilizing low profile heads require a fastener hole with two different diameters.

In most instances it is a requirement in metal-to-wood mounting applications that the fastener be tamper-proof, or in other words, be permanently installed, which is not possible with conventional fasteners now used for metal-to-wood or the like applications.

For instance, in the handling of cargo to and from foreign countries, it has been found that many fasteners used on containers could be tampered with and thus, the containers could be used to carry contraband. An untamperable fastener, one that cannot be removed or replaced without damage to the material fastened is needed in the industry.

In general, the requirements of the interested industries for an efficient metal-wood application fastener are basically as follows:

a. a high-strength fastener providing a high clamping force between metal and wood, radially into the wood and permanently onto the metal, b. low profile heads on both sides of the materials fastened together, c. a self-sealing feature, d. a permanent, unremovable mounting, and e. an installation procedure which is economical, fast, efficient, and with the least preparation necessary, such as a simple one-diameter hole through the structural elements to be secured.

The present invention fulfills the above requirements and in addition, offers additional advantages.

It should be noted that a low-profile head on both sides of the structure is necessary for various reasons. For instance, when using a fastener for containers, a protruding head on the locking sleeve side would cause damage to merchandise stored within a vessel or container, while the dimension of the protruding head decreases the storage space. A protruding head on the pin side would hinder the movement of cargo containers by catching on surrounding structures, with the inherent danger of rupture of the fastener and joint, thus defeating the intended purpose.

In general, the present invention relates to a fastener adapted to be inserted into a workpiece for securing at least one outside layer of hard material to one side of a layer of softer material. The workpiece is provided with a straight hole having a constant diameter wall therethrough. The fastener has three main components:

a. a pin, to be inserted in the hole, having, in series, a pulling section, a break-off groove, a die section and a button section, b. a locking sleeve including a shank with a ring-shaped head and adapted to be disposed about the pin pulling section during installation of the fastener, and c. a swaging sleeve having a first and second end adapted to be disposed about the pin pulling section prior to the locking sleeve. Upon installation by an associated fastener installing tool connected to the pulling section, the following takes place: (1) the button becomes engaged against the hard material outside surface; (2) the swaging sleeve second end becomes swaged over the die section so that the second end expands radially into the softer material and (3) the locking sleeve ring-shaped head engages to the workpiece other surface in reference to the hard material outside surface, whereby the shank moves between the first end and the dies section and the first end becomes expanded into the softer material wall. As a result, the first and the second ends are both locked into the hole constant diameter wall and the button and the ring-shaped head secure the workpiece two materials permanently together.

It is therefore an object of the present invention to provide for a high-strength, self-sealing fastener for metal-wood applications.

It is another object of the present invention to provide for a fastener for metal-wood applications which can be easily and economically installed within a matter of seconds.

It is an additional object of the present invention to provide for a fastener which has low profile heads incorporating a self-sealing feature and wherein the mounting installation of the fastener is divided into various forces due to the swaging of the inherent components involved which individually cause radially expanding and locking penetrating means and axially locked clamping means between wood and metal separately as well as between the wood and metal in combination.

Of course, it should be understood that it will be obvious that metal-to-wood structures incorporate any type of hard or substantially incompressible material next to a compressible material. In other words, the metal could be replaced by equally hard materials, such as plastic or asbestos cement and the wood by various fiber materials, synthetics, honeycomb core, etc.

These and other objects and advantages of the present invention will be better understood by referring to the following detailed description taken in conjunction with the accompanying drawings which are explained briefly hereinafter.

IN THE DRAWINGS

FIG. 1 is an exploded view of the fastener comprising a locking sleeve, a swaging sleeve, a sealing ring and a pin.

FIG. 2 is a perspective view of the locking sleeve.

FIG. 3 is a cross-section showing the individual fastener parts properly arranged prior to final installation.

FIG. 4 is a cross-section showing the installed fastener in a wood-metal joint.

FIG. 5 is a side view of the fastener pin and a crimped swaging sleeve in a loosely connected arrangement about the pin. This arrangement improves handling and fastening operations and is considered as a second embodiment.

DESCRIPTION AND OPERATION OF THE INVENTION

Referring to all the drawings and, in particular, to FIG. 1, the preferred embodiment of the fastener of the invention is indicated generally by the reference numeral 10. The exploded view in FIG. 1 illustrates the various parts of the fastener 10 in their correct location prior to fastener installation. The various components are: a tubular locking sleeve 12, a tubular swaging sleeve 14, an optional sealing ring or washer 16, and a pin 18.

Considering now each component in more detail, attention is directed to FIG. 1 and FIG. 2. These figures show the locking sleeve 12 having a shank 30 with a radially enlarged, low profile, ring-shaped head 32 and a passageway 34 disposed concentrically about the shank 20 longitudinal axis 36. The shank 30 has a constant diameter portion which is followed by a tapered portion 38. The tapered portion 38 as well as part of the shank 30 is provided with "V" shaped slots 40 at regular distances from one another and in a direction that is longitudinal and parallel to and about the axis 36. As illustrated, the slots 40 extend only part way into the shank 30. However, it should be understood that various minor changes in slots 40 as well as their length can be contemplated.

The tubular swaging sleeve 14 has an outside diameter which is substantially equal to the constant diameter of the shank 30. The inside diameter of the swaging sleeve 14 varies from a constant diameter in the middle or second internal portion 50 towards a tapered or continuously enlarging diameter at both ends or first and third internal portions 52 and 54, respectively.

The ring or washer 16 which is made from rubber or any other well known and conventional sealing material is optional and only required for maximum sealing purposes; however, in such a connection it will be a definite required part of the inventive concept.

The pin 18 carries the components 12, 14 and 16 in a stacked order as illustrated in FIG. 3 prior to final installation.

In consecutive order, the pin 18 can be described and divided into various sections, such as a pulling section 60, which has a plurality of pulling or gripping means or rings 62 forming the upper part of the pin 18, used during installation when a standard fastener installing tool (not shown) is connected to the rings 62 for the application of a pulling force by the tool.

The following section of the pin 18 is a breaking-off section 66 which normally represents a groove 66 with the smallest diameter of the pin 18 at the bottom groove 66 or intersection 68 formed by the groove 66 decreasing portion 70 and increasing portion 72. The breaking-off section 66 is followed by a ring 76 which has a relatively pointed appearance and almost sharp circumference formed by the flange sides 78 and 80 of the ring 76. The diameter of the ring 76 circumference is slightly smaller than the passageway 34 of the locking sleeve 12.

After the ring 76 there is a die section 80 which can be considered as a build-up of two cone frustums connected with their smaller bases where the first frustum 84 is followed by the second frustum 86. The drawing illustrates a decreasing diameter section 84 and increasing diameter section 86 which represents the frustums 84 and 86. This die section 80 in combination with the ring 76 provides for several locking actions which will be explained hereinafter. The second frustum 86 terminates in a circumference having a diameter 88 which is equal to the constant diameter of the shank 30 and outside diameter of the swaging sleeve 14. The next section 90 is relatively straight and is shaped as a right circular cylinder with a diameter equal to diameter 88. This straight section 90 is followed by a radially enlarged, low-profile head or button 92 which has a slightly concave under surface 94 which carries the sealing ring 16 during installation.

As shown in FIG. 3 the fastener 10 is properly arranged for installing or setting procedures in a workpiece 100 which is a buildup of at least one hard material such as metal 102 next to a soft or wood material 104 and may be covered by a layer of hard material 106, forming a sandwich configuration (as indicated by the dashed line).

Since the novel fastening action of the fastener 10 takes place at the side carrying the metal outside layer 102 and the middle portion or wood 104, the metal layer 106 is kept optional, but should be considered as another practical and useful arrangement most likely of interest to the concerned industries.

As further shown in FIGS. 3 and 4, the workpiece 100 is provided with a straight hole 110 having a constant diameter wall 112. The pin 18 is inserted in the workpiece 100 hole 110 from the metal 102 side so that the button 92 concave surface 94 provided with or without ring 16 rests against the metal 102. The swaging sleeve 14 is slid over the pulling section 60 from the other side which is followed by the locking sleeve 12. Another manner, which is considered less complicated and time consuming is to insert the pin 18 with the swaging sleeve 14 already attached. During use it became evident that for handling purposes the swaging sleeve could be slightly crimped at its outside diameter and as a result would remain loosely about the pin die section 82. This would eliminate one loose part and also connect the right diameter swaging sleeve with the correct pin size. In addition, it was found that upon installation of the fastener 10 with a crimped sleeve 120 as shown in FIG. 5 that not only this idea saved time, but the installation fastening forces were improved. The swaging sleeve 120 crimped middle portion 122 tends to direct the first and third portions 126 and 128 radially outwards and therefore, upon installation the sleeve outer portions 126 and 128 are more or less aligned for penetration into the wood wall 112 so that a deeper and improved locking action is achieved.

INSTALLATION AND COOPERATION OF PARTS

The nose portion of a standard fastener installing tool is engaged with the gripping means 62 and the ring-shaped head 32. Upon actuating the tool, a pulling force is applied to the pin 18 and a pushing force to the ring-shaped head 32. The combined oppositely directed forces will move the shank 30 with its tapered portion 38 against the swaging sleeve 14 and firmly position the swaging sleeve 14 on the die section 82. The locking sleeve 12 "V" slotted tapered portion 38 passes the ring 76 and locks itself between the first frustum 84 and first internal portion 52. The "V" slots 40 allow the tapered portion 38 circumference to reduce and establish a tight fit about the die section 82.

The first internal portion 52 is pushed radially outwards (see arrow A, FIG. 4) by the locking sleeve 12 passing the ring circumference 76 and penetrates into the wood wall 112 of the hole 110.

The third internal portion 54 inside tapered surface slides over the die or second frustum 86 and at about the circumference having diameter 88 swages radially outwards (see arrow B, FIG. 4) along the inner surface of the metal 102 into the wood 104. The portion 54 and the head or button 92 hole-overlapping concentric part 124 provide for a clamping force C—D as indicated by the arrows C and D on the metal 102. Thus, the fastener 10 is firmly engaged or mounted onto the metal 102 and the fastener 10 also connects the wood 104 and metal 102 by a clamping force E—C as indicated by the arrow E and C in FIG. 4. In short, the combined force developed by the fastener installation tool is divided into four separate force actions which produce the novel joint connection as illustrated.

It will be obvious to the people familiar with the art that the joint obtained by the fastener parts as shown in FIG. 4 involves a metal flowing activity during installation between the components and also that removal of such a finished installed fastener 10 requires destruction of the workpiece materials located between the ring-shaped head 32 and the button 92. Finally, upon continued pressure build-up by the installing tool still connected to the gripping means 62, the pulling section 60 of the pin 18 will separate at the intersection 68, which will signify that the fastener 10 is installed.

As mentioned before, the components illustrated represent the preferred embodiment of the fastener 10; however, it should be understood that, for instance, the locking sleeve 12 shank 30 and tapered portion 38 could be one gradually tapering shank just as the inside diameter portions of the swaging sleeve could be of a convex-shaped cross-sectional configuration.

Furthermore, it should be noted that the various phases of the setting or installing operation take place in desired sequence by virtue of the cooperative relationship of the fastener parts, and also that the installation, as with other types of fasteners installed by this same conventional tool, is accomplished, regardless of these various phases, within a few seconds.

Although the preferred embodiments of the invention have been shown and described in considerable detail, it will be understood that various changes in the details of construction and arrangement may be made without departing from the spirit and scope of the invention as defined in the appended claims.

Now, therefore, I claim:

1. A fastener adapted to be inserted into a workpiece for securing at least one outside layer of hard material to one side of a layer of softer material provided with a straight hole having a constant diameter wall therethrough, comprising in combination, a. a tubular locking sleeve including a shank with a radially enlarged ring-shaped head, said head and shank provided with an axial passageway, said shank gradually tapering towards said axial passageway diameter, said locking sleeve shank being adapted to be inserted into said hole with said ring-shaped head abutting said workpiece surface;

b. a pin including, in series: a pulling section initially disposed in said passageway and projecting from said ring-shaped head of said sleeve; a sharp break-off groove shaped intersection forming said pin smallest diameter; a ring section with an outer circumference of a diameter slightly smaller than said passageway; a die section having a decreasing diameter part changing into a second increasing diameter part; a straight section of constant diameter and length equal to said layer of hard material thickness; and a radially enlarged button larger than said straight hole diameter;

c. a tubular swaging sleeve having a first and second end and tapered internally towards said first and second end, the internal diameter of said first end being greater than the external diameter of the end of said locking sleeve remote from said head, and the internal diameter of said second end being less than at least the maximum diameter of said increasing diameter part of said die section, said swaging sleeve adapted to be disposed about said die section so that upon installation of said fastener said swaging sleeve is forced by said locking sleeve about said die section, whereby said second end swages and penetrates radially into said hole wall softer material next to said hard material and said first end swages by force of said locking sleeve passing over said ring circumference radially and penetratably into said hole wall softer material while simultaneously said pin button abuts against said hard material outside surface thereby fastening together said hard and softer materials between said button and said ring-shaped head.

2. A fastener as claimed in claim 1 wherein said tubular locking sleeve shank is provided with a plurality of slots which extend at predetermined distances substantially parallel to said passageway axis, so that during installation said slots become closed and said shank reduces in circumference about said die section for final press fit between said die section and said swaging sleeve.

3. A fastener as claimed in claim 2 wherein said fastener is provided with a sealing ring disposed concentrically at said pin button inside surface and having a diameter larger than said straight hole diameter and smaller than said pin button circumference so that upon installation when said button is abutting onto said hard material outside surface, said ring becomes tightly compressed between said button inside surface and said hard material outside surface in a substantially concentrically mode for providing maximum sealing characteristics to said fastener.

4. A fastener as claimed in claim 3 wherein both said tubular swaging sleeve outside circumferences at said first and second end gradually and slightly reduce towards said swaging sleeve approximate outside center circumference and wherein said ring outside circumference is larger than said swaging sleeve internal circumference at said approximate center so that dislodging of said swaging sleeve from said die section is prevented.

5. A fastener adapted to be inserted into a workpiece for securing at least one outside layer of metal to a layer of wood provided with a straight hole having a constant diameter wall therethrough, comprising in combination:

a. a tubular locking sleeve including a shank with a radially enlarged low profile ring-shaped head at one first end and an axial passageway extending therethrough from said first end to a second end, said shank having a constant diameter portion slightly smaller than said straight hole diameter followed by a tapered portion, said sleeve being adapted to be inserted into said straight hole with said ring-shaped head abutting said workpiece surface and said shank fitting in complementing relationship within said straight hole;

b. a pin including, in series: a pulling section initially disposed in said passageway with gripping means projecting from said ring-shaped head end of said sleeve; a breaking-off section comprising a decreasing diameter portion followed by an increasing diameter portion thereby creating between said decreasing and increasing portion a substantially sharp break-off intersection at said pin smallest diameter; a ring section having a substantially sharp pointed outer circumference of a diameter slightly smaller than said passageway diameter; a die section shaped as a first frustum connected with its small base surface to a second frustum small base, of equal diameter, said second frustum enlarging circumference terminating in said second frustum large base having a diameter substantially equal to said shank constant diameter portion; a straight section of a diameter equal to said second frustum large base diameter and of a length substantially equal to said layer of metal thickness; and a radially enlarged low profile head of substantially larger diameter than said straight hole diameter;

c. a tubular swaging sleeve having a first, second and third portion, said second portion having a substantially uniform inside diameter and said first and third portion tapering from each side of said second portion, the internal diameter of said first portion being greater than the external diameter of said second end of said locking sleeve, and the internal diameter of said third portion being less than at least the maximum diameter of said second frustum of said die section, said swaging sleeve adapted to envelop said pin die section when an associated installing tool pulls said pin pulling section by connection to said gripping means so that said pin enlarged head abuts said metal outside surface and said tool pushes said locking sleeve ring-shaped head in abutment with said workpiece outside surface opposite said metal outside surface, whereby said locking sleeve moves said swaging sleeve over said pin die section thereby swaging said third portion radially into said wood material forming said wall of said hole adjacent said metal inside surface and whereby said first portion swages radially into said wood material forming said wall of said hole by expanding and pushing forces from said locking sleeve tapered portion passing over said ring section circumference and whereby said continuous pressure build-up after said fastener becomes installed, breaks said pin at said intersection.

6. A fastener as claimed in claim 5 wherein said tubular locking sleeve shank and said tapered portion are provided with a plurality of "V" shaped slots which extend longitudinally at regular predetermined distances substantially parallel to said passageway axis and extend through said tapered portion and partly into said shank so that during installation said slots become closed and said tapered portion reduces in circumference about said first frustum for final press fit about said die section between said first frustum and said first and second portion of said swaging sleeve.

7. A fastener as claimed in claim 6 wherein said fastener is provided with a sealing ring disposed concentrically at said pin head inside surface and having a diameter larger than said straight hole diameter and smaller than said pin head circumference so that upon installation when said pin head is pulled onto said metal outside surface, said ring becomes tightly compressed between said pin head inside surface and said metal outside surface in a substantially concentrically mode for providing maximum sealing characteristics to said fastener.

8. A fastener as claimed in claim 7 wherein said pin die section second frustum enlarging circumference from said small base to said second frustum large base increases at a ratio which provides for a slightly concave surface on said second frustum for guiding said third internal portion of said swaging sleeve in a radial direction, at about said large base, outwardly into said wall wood material next to said metal inside surface.

9. A fastener as claimed in claim 8 wherein said tubular swaging sleeve has an outside diameter at said first and third portion which is substantially equal to said shank constant diameter and wherein said second portion has an outside diameter which by a crimping process is slightly reduced in comparison to said first and third portion outside diameters so that said tubular swaging sleeve second portion inside diameter becomes smaller than said pin ring circumference thereby retaining said swaging sleeve about said pin die section prior to inser-tion and installation of said fastener.

* * * * *